(12) United States Patent
Archer, Jr.

(10) Patent No.: US 6,431,072 B1
(45) Date of Patent: Aug. 13, 2002

(54) PROPELLANT GRAIN CONFIGURATION

(75) Inventor: Harry L. Archer, Jr., Alexandria, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 21 days.

(21) Appl. No.: 09/712,718

(22) Filed: Nov. 30, 2000

(51) Int. Cl.$^7$ ................................................ F42B 1/028
(52) U.S. Cl. ........................ 102/284; 102/287; 102/288
(58) Field of Search ................................. 102/284, 287, 102/288

(56) References Cited

U.S. PATENT DOCUMENTS

| | | | |
|---|---|---|---|
| 3,201,936 A | * 8/1965 | Bancelin | 102/284 |
| 3,256,819 A | * 6/1966 | Leeper | 102/284 |
| 4,015,427 A | 4/1977 | Brooks | 60/253 |
| 4,474,715 A | * 10/1984 | Weber et al. | 102/288 X |
| 4,578,947 A | 4/1986 | Hodges, Jr. et al. | 60/253 |
| 5,111,657 A | 5/1992 | Hivert et al. | 60/224 |
| 5,211,224 A | * 5/1993 | Bouldin | 102/284 |
| 5,385,099 A | * 1/1995 | Chase | 102/288 X |
| 5,526,949 A | 6/1996 | Carey et al. | 215/386 |
| 5,551,343 A | * 9/1996 | Hock | 102/288 |
| 5,785,195 A | 7/1998 | Zwemer et al. | 215/329 |
| 6,101,948 A | * 8/2000 | Knaresboro et al. | 102/287 X |

* cited by examiner

Primary Examiner—Peter A. Nelson
(74) Attorney, Agent, or Firm—Mark Homer

(57) ABSTRACT

A propellant grain for a cylindrical casing has a cavity including an axially central opening with a combustion product exit port at one end. The grain bears a plurality of surfaces extending circumferentially about and disposed normally or helically to this opening so as to define, between these surfaces and axially of the casing, alternating sections of propellant and sections of a groove or grooves in the propellant. The groove sections extend radially from the opening to a distance selectable to provide the grain with a large initial surface area while providing a high propellant volume.

21 Claims, 2 Drawing Sheets

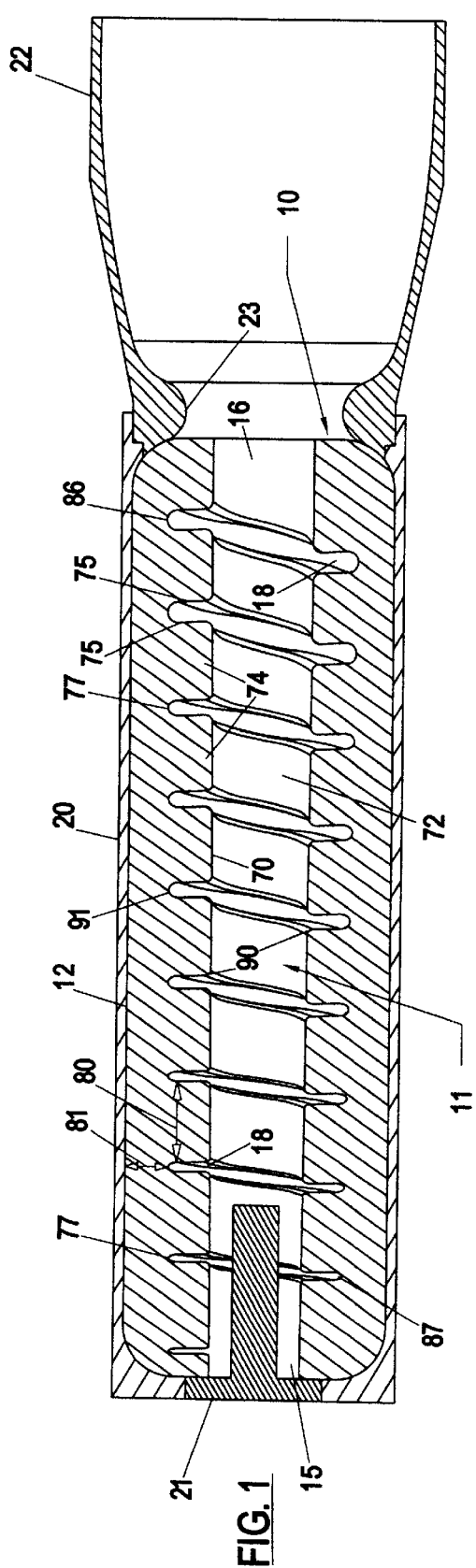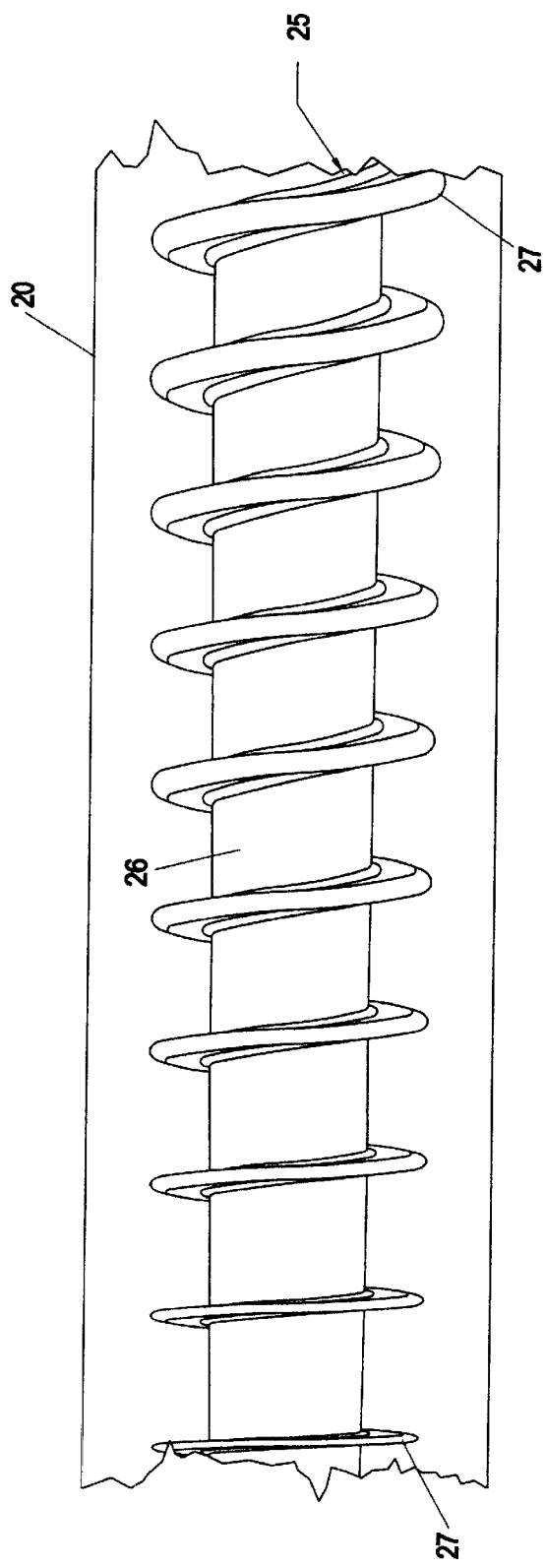

PROPELLANT GRAIN CONFIGURATION

BACKGROUND OF THE INVENTION

(1) Field of the Invention

The present invention relates to a solid propellant power plant having a unitary mass of propellant ignited to create a hot gas which may be the moving force of a reaction motor; more particularly, the invention relates to such a mass having an internal surface of a specific configuration to control the burning rate of the propellant. The invention further relates to such a mass wherein the specific configuration may be helically grooved and conical and be formed by a conforming article shaping apparatus.

(2) Description of the Related Art

For the purposes of the present application, a grain of solid rocket propellant is defined as a unitary mass having a particular form or as plurality of individual forms united to define a particular composite form, the form having a surface of specific configuration. Such a grain is thus not a granule used in combination with other unconnected granules in particulate or powdered material.

It is known to provide such a grain of solid rocket propellant with a cavity configured to vary or otherwise control the burning rate of the propellant. For examples:

U.S. Pat. No. 4,015,427 issued Apr. 5, 1977 to Brooks discloses such a grain for use in a spherical casing and having an internal cavity defined by a plurality of regressively burning star point segments and a plurality of segments with parallel side walls positioned there between.

The segments are defined by planes parallel to the axis of a nozzle attached to the casing, and the segments are configured to provide a sharp transition from boost to sustain operation.

U.S. Pat. No. 4,578,947 issued Apr. 1, 1986 to Hodges, Jr. et al discloses a solid propellant grain with a central, solid, cylindrical rod portion extending axially of a nozzle and having a diameter of "2R". To provide neutral burning, the rod portion is disposed coaxially within a hollow, cylindrical web portion having a radial thickness of "R".

U.S. Pat. No. 5,111,657 issued May 12, 1992 to Hivert et al. discloses such a grain or block of propellant which is coaxially related to a nozzle, is externally cylindrical, and defines a longitudinal central duct. The block has a cylindrical, downstream portion smaller in diameter than two thirds of the diameter of the throat of the nozzle and has a cylindrical, larger diameter, upstream portion connected to the downstream portion by a portion in the shape of a truncated cone. The length of the upstream portion is between two and four times the external diameter of the block and less than the length of the downstream portion, and the total length of the block is more than six times its external diameter.

It is also known to provide helical grooves about a conical opening in a conically threaded closure system as disclosed in U.S. Pat. No. 5,785,195 issued Jul. 28, 1998 to Zwemer et al.

In addition to providing desired burn rates or variations in burn rates during the combustion of a grain of solid rocket propellant by the surface configuration of the grain, it is desirable that the configuration of a cavity of such a grain be adapted to a variety of casing shapes, waste a minimal amount of the volume within the casing, and be convenient to manufacture, as by casting.

It may also be desirable that the cavity configuration provide a large initial burning surface area together with a neutral burning rate; and, with pressure-sensitive propellants, it is desirable that the area of a port through which combustion products exit from the grain be relatively large in relation to the area of the throat of an associated nozzle.

To maintain the desired burning characteristics, it is important that the grain not be fissured or otherwise have its surface disrupted by strains due to burning or vibration. In this regard, it has been found that a cavity with surfaces extended along the axis of the cavity, as in the typical star or grooved shaped cavity, results in longitudinal strains in the propellant.

Finally, it is desirable that the configuration of the cavity of a grain of solid propellant not, as was common in such configurations of the prior art, provide certain of the above-mentioned desirable features by sacrificing others of these features.

SUMMARY OF THE INVENTION

A propellant grain configured for reception in a cylindrical casing has a central cavity extended generally along the casing axis. The cavity has a central opening which may be cylindrical or be a conical frustum and, at one end serves as port for exit of combustion products from the grain. The grain is characterized by a plurality of surfaces extending circumferentially about this opening and disposed normally or helically in relation to the casing axis so as to define, between the surfaces, alternating sections of propellant and a groove or grooves in the propellant.

If the surfaces are helical, they may define a single groove or multiple grooves. The grooves extend generally radially from and open into the opening. The radial extent of the grooves may be selected to provide the grain with a large surface area for initial burning, while the grooves may be narrow axially to provide a high propellant volume in the casing, and the port area may be selected to be relatively large in relation to an adjacent nozzle attached to casing. The grain may be made substantially neutral burning by selecting the distance from the radial ends of the groove sections to the casing to be about twice the distance between axially adjacent groove sections. The groove is preferably helical to relieve and distribute longitudinal strains in the grain.

Such a central cavity including a helical groove may be formed by casting the propellant into the casing in which is disposed a conforming mandrel. The mandrel has a central core bearing a helical ridge and is thus removable from the solidified grain by rotating the mandrel to "unscrew" the mandrel from the grain. For better release and removal of the mandrel from the grain, the cavity may be constructed with its central opening and the periphery of the groove being defined by concentric conical frustums, with the groove narrowing in direction axially of the central opening as the groove recedes radially from the opening, and with the groove narrowing progressively axially of the central opening as the groove proceeds along the opening.

An object of the present invention is to provide a propellant grain configuration having a high propellant volume together with a large initial surface area.

Another object is to provide such a configuration wherein longitudinal strains are minimized and are distributed more tangentially along the grain.

A further object is to provide such a configuration that may be configured for a large port area and for either desired burning rate variations or for neutral burning.

Yet another object is to provide such a configuration that is convenient to manufacture.

A further object is to provide such a configuration having the foregoing advantages and fully effective for propulsion.

BRIEF DESCRIPTION OF THE DRAWINGS

These and other objects, advantages, and novel features of the present invention will be apparent from the following detailed description when considered with the accompanying drawings wherein:

FIG. 1 is an axial section of a representative rocket motor incorporating a solid propellant grain having a central cavity of a first and preferred configuration embodying the present invention;

FIG. 2 is a radial view of a mandrel for forming a grain similar to that of FIG. 1, the mandrel being disposed in a sectioned rocket motor casing, and the mandrel and casing being fragmentarily represented;

DETAILED DESCRIPTION OF THE INVENTION

Figure 3:
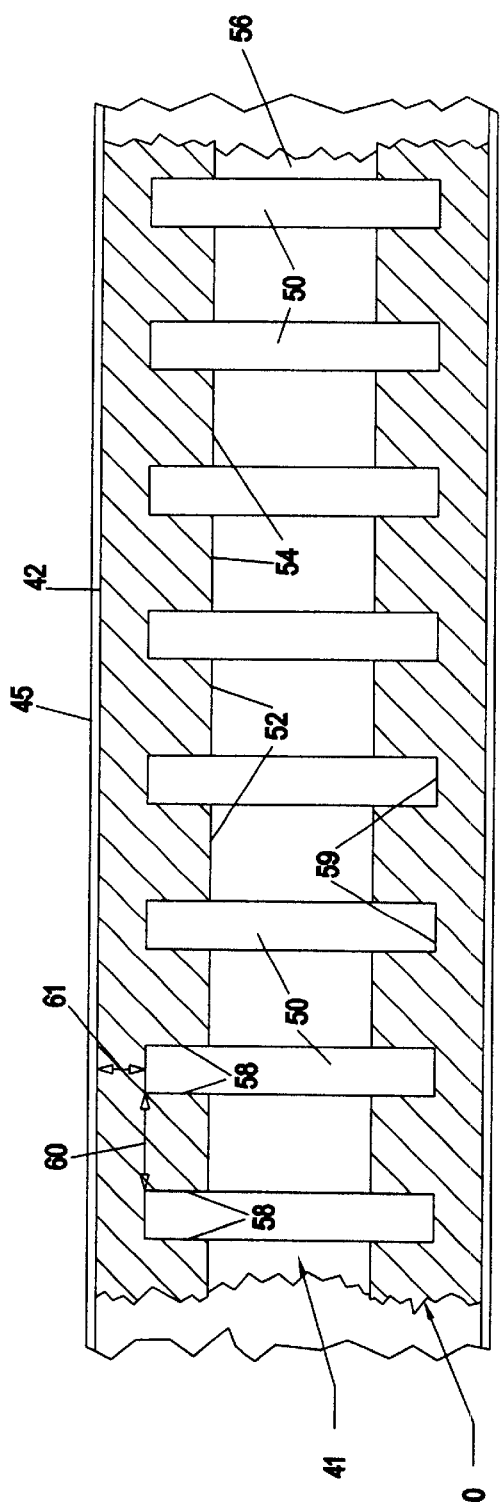
FIG. 3 is an axial section of a solid propellant grain having a central cavity of a second configuration embodying the present invention.

FIG. 1 shows a rocket motor which is a representative operating environment for a solid propellant rocket grain 10 which is a preferred embodiment of the principles of the present invention. Grain 10 has a central cavity 11 with a configuration to be described in greater detail and has a generally cylindrical exterior surface 12. The cavity has an open end 15 at one end of the grain and, at the opposite end, has an open end or port 16 for combustion products from the grain. Grain 10 is characterized by a helical groove 18 having a plurality of turns which extend along and circumscribe cavity 11. It is apparent that this groove opens into the cavity and extends radially therefrom into the propellant toward surface 12.

The rocket motor has other elements which are not features of the present invention and may be of any suitable construction. These elements include a cylindrical casing 20 which receives grain 10 with surface 12 conformingly engaged with the interior surface of the casing. One end of the casing is closed and has a schematically represented igniter 21 which extends into cavity end 15. The other casing end receives a converging/diverging nozzle 22 engaging the grain about port 16, and the nozzle has a throat 23 adjacent to the port. It is to be understood that the casing and the grain, with its surface 12 and other surfaces subsequently to be described, incorporate a number of surfaces of revolution about a common axis extending centrally through cavity 11 and nozzle 22.

Solid propellant grain 10 with its cavity 11 may be constructed by the method of casting the grain into casing 20, in a manner well-known in the solid rocket propellant art, from the propellant in flowable form. When grain 10 is formed in this manner, it is formed by a mandrel 25 disposed centrally in the casing as represented in FIG. 2 where the axial end portions of the casing and mandrel, and any associated casting apparatus, are omitted for illustrative convenience. Mandrel 25 is three-dimensionally inverse in form to cavity 11 and conforms exteriorly to the configuration of cavity 11, as by having a core 26 bearing a helical ridge 27 conforming to groove 18. Such flowable propellant material in liquid form may be poured into casing 20 between the casing and mandrel 25 to set into the solid propellant material of grain 10. A mandrel similar to mandrel 25 may also be used to form the grain from plasticly flowable material which has an exterior corresponding to surface 12 and is extruded over the mandrel while the mandrel is rotated.

In one aspect of the present invention, cavity 11 has a configuration which provides for release and withdrawal of a mandrel, such as mandrel 25, from the solidified grain 10. A basic feature of this configuration is the helical nature of groove 18 and conforming ridge 27 by which, when the flowable material has formed grain 10, the mandrel is removed from the grain by rotating the mandrel about the before mentioned common axis in a direction to "unscrew" the ridge from the groove and thus withdraw the mandrel from the completed grain. Other features of the cavity configuration which facilitate the release of the mandrel from the grain will be subsequently explained in detail.

In FIG. 3 is shown a solid propellant grain 40 having another cavity configuration embodying the principles of the present invention. This grain has a central cavity 41 and a generally cylindrical exterior surface 42 and is depicted in a casing 45 which corresponds to casing 20. The axial end portions of grain 40 and casing 45 typically include igniter, nozzle, and exit port structures similar to those shown in FIG. 1 for grain 10 and casing 20, such structures being omitted in FIG. 3 for illustrative convenience.

The cavity configuration shown in FIG. 3 may be formed in any suitable manner as by casting grain 40 over a collapsible core or by stacking rings of solid propellant material. It is apparent that casing 45 and grain 40, with its surface 42 and other surfaces subsequently to be described, are similar to casing 20 and cavity 11 by bearing a number of surfaces of revolution about a common axis extending centrally through the casing and cavity.

The cavity configuration shown in FIG. 3 is characterized by having a plurality of grooves 50 spaced equally axially along cavity 41 in circumscribing relation thereto so as to define segments 52 of propellant spaced along the cavity and disposed axially oppositely of the grooves. It is apparent that the grooves open into the cavity and extend radially therefrom into the propellant toward surface 42. The cavity has a plurality of cylindrical central walls 54 separating the grooves and defining a central opening 56 of the cavity. Each groove has a pair of axial side walls 58 that are disposed in facing relation and are surface sections of planes normal to the cavity axis. Each groove is terminated radially of the cavity by a cylindrical end wall 59 connecting the side walls. It is apparent from FIG. 3 that the central walls are surface sections of a common first cylinder and that the end walls are surface sections of a common second cylinder circumscribing such first cylinder. Also, it is evident that cavity 54 is defined by side walls 58 and end walls 59, together with central walls 54.

A grain of solid propellant having the cavity configuration shown in FIG. 3 may be made substantially neutral burning by having the axial distance, which is indicated by dimension line 60, between each two side walls 58 about twice the radial distance, indicated by dimension line 61, between end walls 59 and surface 42.

Referring again to FIG. 1, it is seen that cavity 10 is partially defined by a central wall 70 formed by surface sections of a first conical frustum having its largest diameter at port 16 and defining a central opening 72 of the cavity, these surface sections being disposed axially between turns of helical grove 18 which extends generally along a helix on the first frustum and extends radially from wall 70. Groove 18 thus circumscribes this frustum and defines between each turn of the groove a plurality of segments 74 of propellant which are spaced axially along the cavity and are disposed axially oppositely of each turn of the groove. It is apparent that the groove and propellant segments are helically related to the first frustum.

Groove 18 has a pair of axially spaced sidewalls 75 that are disposed in facing relation and extend radially from the above-mentioned first conical frustum to a second conical frustum which is coaxially related to the first frustum and which, similarly, has its largest diameter at port 16. The groove is terminated radially of the cavity by a helical end wall 77 connecting the side walls and disposed at a second conical frustum which is coaxially related to the above-mentioned first conical frustum and which also has its largest diameter at port 16. It is apparent from FIG. 1 that side walls 75 may be considered to define grove 18 and propellant segments 74. It is further apparent that side walls 75 may be regarded as a continuous plurality of surface sections extending radially from the first frustum and spaced along it so as to intersect this frustum at helices along this frustum, these surface sections being connected by additional surface sections corresponding to end wall 77 and connecting side walls 75. Also, it is evident that side walls 75 and end wall 77 define cavity 11 together with central wall 70.

A grain of solid propellant having the cavity configuration shown in FIG. 1 may be made substantially neutral burning by having the width of each segment 74 axially along opening 72, this width being indicated by dimension line 80, about twice the distance, which is indicated generally by dimension line 81, between the groove end walls 77 at the above-identified second conical frustum and the cylindrical exterior surface 12.

The configuration of solid propellant cavity 11 shown in FIG. 1 is characterized by structure facilitating release of mandrel 25 after casting as described above, this release being difficult because of the elastomeric and adhesive nature of typical propellants. These features are illustrated in FIG. 1 and in also in FIG. 4 wherein the same numerals are used for corresponding elements. First, it is evident that the frusto-conical form of cavity central wall 70 and the frusto-conical configuration of groove end wall 77 result in any withdrawing rotation of the mandrel immediately disengaging the conforming mandrel core 26 and ridge 27 from the propellant.

Figure 4:
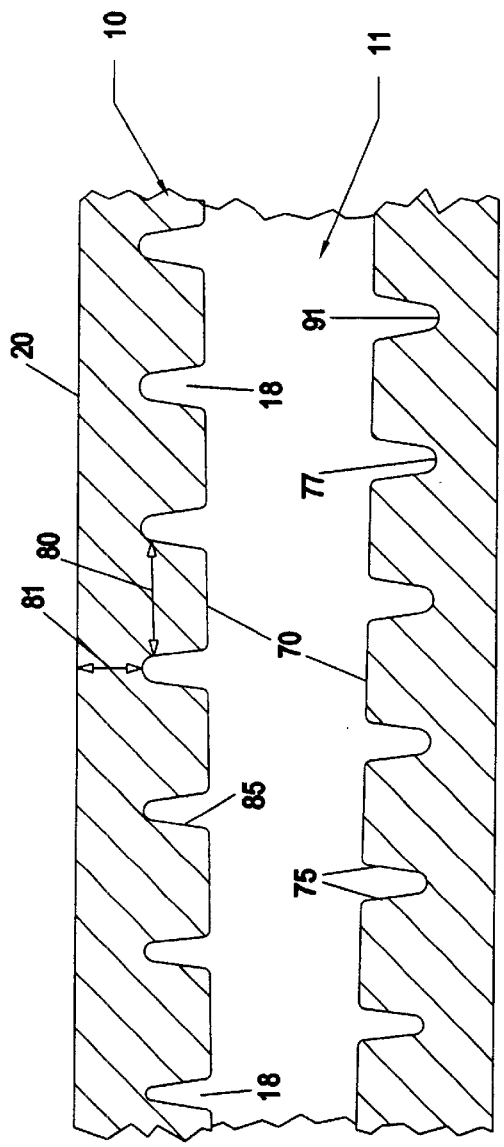
FIG. 4 is an axial section of a solid propellant grain similar to the grain of FIG. 1 and in a rocket motor casing, the grain and casing being fragmentarily represented and lines representing a groove on the farther side of the cavity being omitted for clarity.

Another such disengaging structure is shown in FIG. 4 and is that, at any location on the groove 18 axially along the frusto-conical cavity central opening 72, the groove narrows somewhat in a direction axially of this opening as the groove recedes radially from said central opening. This narrowing is apparent at the groove turn indicated in FIG. 4 by numeral 85 and may be formed by a mandrel, otherwise like mandrel 25, having a correspondingly narrowing ridge.

A further such disengaging structure is that, as groove 18 proceeds in a direction axially along opening 72 from port 16, the groove itself narrows progressively axially as is apparent by comparison of the thickness of the groove near the port, or to the left in FIG. 4 and as indicated by numeral 86, with such thickness near open cavity end 15 or to the right in FIG. 4 and as indicated by numeral 87. Release of a mandrel, such as mandrel 25, from a propellant grain, such as grain 10, may also be facilitated by coating the mandrel with a synthetic fluorine-containing resin.

A solid propellant grain, such as grain 10 and embodying the principles of the present invention, is advantageously provided with radii to facilitate the flow of propellant casting material. In FIG. 1 such a radius, indicated by numeral 90, is provided at the intersection of groove side walls 75 with central wall 70; and in FIGS. 1 and 4, groove end wall 77 is of full radius configuration as indicated by numeral 91.

Advantages of rocket propellant grains having cavity configurations in accordance with the present invention will now be pointed out. First, it is apparent from FIGS. 1, 3, and 4 that in such configurations the cavity lacks surfaces extended along the axis of the cavity to cause longitudinal strains in the propellant. The configurations of FIGS. 1 and 4 are particularly effective for this purpose since groove 18 is helical so as to relieve and distribute longitudinal strains.

The configuration of FIG. 1, wherein groove 18 is relatively narrow axially, provides a high propellant volume and a large initial burning surface area. At the same time the depicted relation of dimensions 80 and 81, provides a substantially neutral burning rate while the area of port 16 is relatively large in relation to area of nozzle throat 23.

The strain relief advantage of the present invention may, of course, be provided with other ratios of dimensions corresponding to the dimensions 80 and 81 or to the dimensions 60 and 61 of FIG. 3.

Finally and as before stated, the configuration of the cavities identified by numeral 11 is particularly advantageous as providing the foregoing advantages while being easily formed by a mandrel, such as mandrel 25, which may conveniently removed after forming a solid propellant rocket grain embodying the principles of the present invention.

Although this invention has been described in connection with a preferred and other practical and effective embodiments, it is recognized that departures may be made therefrom within the scope of the invention. which is not limited to the illustrative details disclosed.

What is claimed is:

1. A grain of solid propellant comprising:
   a plurality of first surface sections defining a cavity in the grain, said first surface sections being disposed on a surface of revolution having an axis;
   a plurality of second surface sections further defining said cavity, said second surface sections extending radially from the surface of revolution and being spaced along said axis so that said second surface sections define a groove extending generally circumferentially of said surface of revolution and define a plurality of segments of propellant disposed oppositely of said groove in a direction along said axis; and,
   a gap, containing propellant, between said second surface sections and a periphery of the grain wherein said gap promotes a neutral burn of said propellant.

2. The grain of solid propellant of claim 1 wherein said second surface sections are disposed on planes generally normal to said axis and spaced along said axis so that said second surface sections define a plurality of grooves in the propellant.

3. The grain of solid propellant of claim 2 wherein:
   said second surface sections are disposed in pairs and the second surface sections of each pair are disposed in facing relation oppositely of one groove of said plurality of grooves; and
   the grain of solid propellant further comprises a plurality of third surface sections further defining the cavity, each of said third surface sections connecting one pair of said pairs of said second surface sections.

4. The grain of solid propellant of claim 3 wherein said surface of revolution is a first cylinder, and said third surface sections are disposed on a second cylinder circumscribing said first cylinder.

5. The grain of solid propellant of claim 1 wherein each of said second surface sections intersects said surface of revolution along a helix on said surface of revolution, and a pair of said second surface sections are disposed in facing relation oppositely of said groove in the propellant.

6. The grain of solid propellant of claim 5 wherein said pair of said second surface sections define said groove and said segments of propellant, so that said groove and said segments of propellant are generally helically related to said surface of revolution.

7. The grain of solid propellant of claim 6 wherein the grain of solid propellant further comprises a plurality of third surface sections further defining the cavity, each of said third surface sections connecting one pair of said pairs of said second surface sections.

8. The grain of solid propellant of claim 7 wherein said surface of revolution is a first conical frustum and said third surface sections are disposed at a second conical frustum circumscribing said first conical frustum.

9. A method of forming the grain of solid propellant of claim 8 comprising:
providing a casing for said grain of solid propellant;
placing in said casing a mandrel exteriorly conforming to said cavity, said mandrel having a core corresponding to said first conical frustum, and bearing about said core a helical ridge conforming to said groove, forming a gap between said helical ridge and a periphery of said solid propellant, said ridge terminating at said second conical frustum;
providing a flowable material that sets into said solid propellant;
casting said flowable material into said casing between said casing and said mandrel to form said grain of solid propellant; and
removing said mandrel from said grain of solid propellant by rotating said mandrel about said axis in a direction to withdraw said helical ridge from said groove.

10. A cavity configuration for a grain of solid propellant having a generally cylindrical exterior surface extending along an axis, the cavity configuration comprising:
a central wall conforming generally to a first surface of revolution about the axis, said central wall defining a central opening extending along said axis into said solid propellant, and having an end forming an exit port for the cavity; and
at least one groove extending radially from said central wall into the propellant toward said exterior surface to a second surface of revolution coaxially related to said first surface of revolution, said groove opening into said central opening, circumscribing said first surface of revolution, and defining a plurality of segments of said solid propellant spaced along said axis and disposed oppositely of said groove, forming a gap between said segments and a periphery of said solid propellant wherein said gap promotes a neutral burn of said propellant.

11. The cavity configuration of claim 10 wherein said groove is one groove of a plurality of grooves spaced along said axis, each of said grooves:
having a pair of axial side walls disposed in facing relation and spaced along said axis, each of said axial side walls being disposed at a plane normal to said axis; and
having an end wall connecting said side walls at said second surface of revolution.

12. The cavity configuration of claim 11 wherein:
each of said segments of said solid propellant is disposed between two adjacent said axial side walls corresponding to adjacent grooves of said plurality of grooves; and
the distance along said axis between two adjacent said axial side walls is about twice the distance between said end wall of each of said adjacent grooves and said generally cylindrical exterior surface,
whereby a grain of solid propellant having said cavity configuration is substantially neutral burning.

13. The cavity configuration of claim 10 wherein said groove extends generally along a helix on said first surface of revolution.

14. The cavity configuration of claim 13 wherein said grove extends for a plurality or turns of said helix so that said groove defines between said turns said plurality of segments of said solid propellant spaced along said axis and disposed oppositely of said groove.

15. The cavity configuration of claim 14 wherein said first surface of revolution is a conical frustum having the largest diameter at one end of said central opening.

16. The cavity configuration of claim 14 wherein said second surface of revolution is a conical frustum having the largest diameter at one end of said central opening.

17. The cavity configuration of claim 14 wherein, at any location on said groove axially along said first surface of revolution, said groove narrows in a direction axially of said first surface of revolution as the groove recedes radially from said central opening.

18. The cavity configuration of claim 14 wherein, as the groove proceeds in a direction axially along said central opening, said groove narrows progressively axially of said first surface of revolution.

19. The cavity configuration of claim 14 wherein:
said first surface of revolution is a conical frustum having the largest diameter toward said exit port;
said second surface of revolution is a conical frustum having the largest diameter toward said exit port;
at any location on said groove axially along said central opening, said groove narrows in a direction axially of said central opening as the groove recedes radially from said central opening; and
as the groove proceeds along said helix in a direction axially along said central opening from said exit port, said groove narrows progressively axially of said central opening.

20. The cavity configuration of claim 19 wherein, at each segment of said plurality of segments, the width of the segment in a direction axially along the central opening is about twice the distance radially between said second surface of revolution and said generally cylindrical exterior surface, whereby a grain of solid propellant having said cavity configuration is substantially neutral burning.

21. A method of forming the cavity configuration for a grain of solid propellant in accordance with claim 18 comprising:
providing a flowable material that forms said solid propellant;
forming said flowable material in a shape corresponding to a generally cylindrical exterior surface;
placing in said flowable material a mandrel conforming to said cavity configuration and including a helical ridge conforming to said groove, forming a gap between said helical ridge and a periphery of said solid propellant; and when said flowable material forms said solid propellant, removing said mandrel from said solid propellant by rotating said mandrel about said axis in a direction to withdraw said helical ridge from said groove, release of said apparatus from said solid propellant being facilitated by said first surface of revolution and said second surface of revolution being conical frustrums; by said groove narrowing in a direction axially of said central opening as the groove recedes radially from said central opening; and by said groove narrowing progressively axially of said central opening as the groove proceeds along said central opening.

* * * * *